J. PEARSON.
DUMP CAR CONSTRUCTION OR THE LIKE.
APPLICATION FILED APR. 4, 1910.
986,309.
Patented Mar. 7, 1911.
4 SHEETS—SHEET 1.
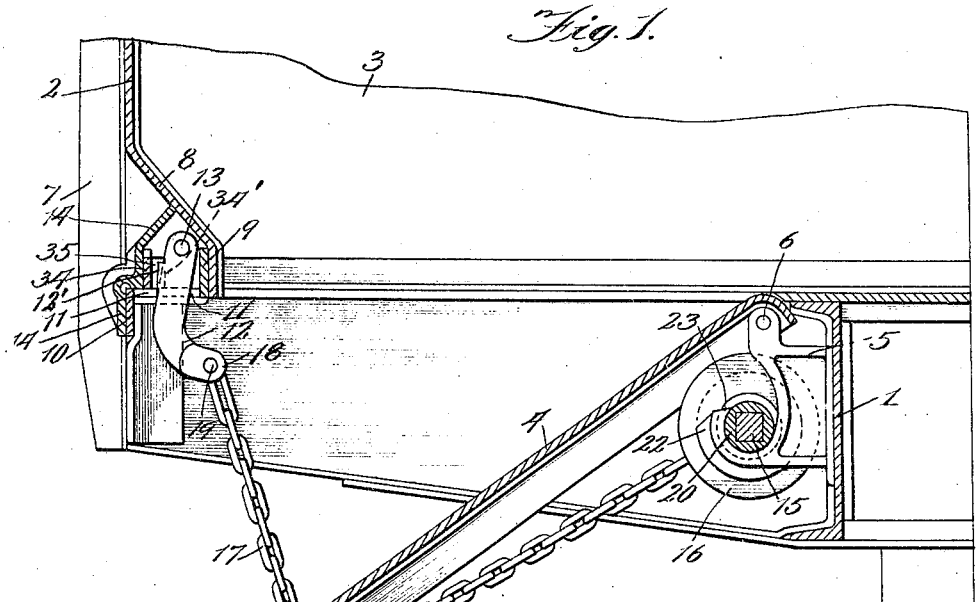
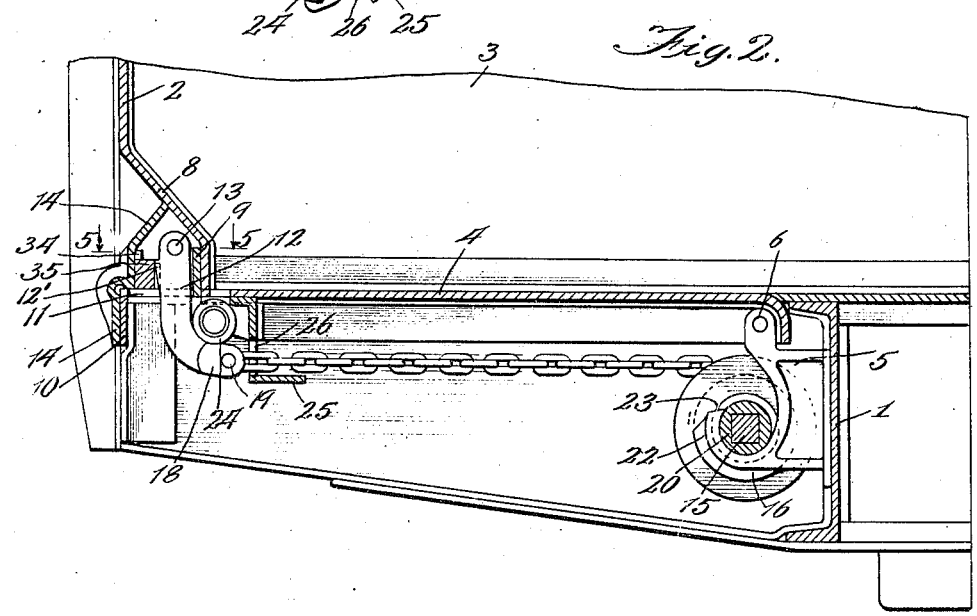
Witnesses:
Inventor:

J. PEARSON.
DUMP CAR CONSTRUCTION OR THE LIKE.
APPLICATION FILED APR. 4, 1910.
986,309.
Patented Mar. 7, 1911.
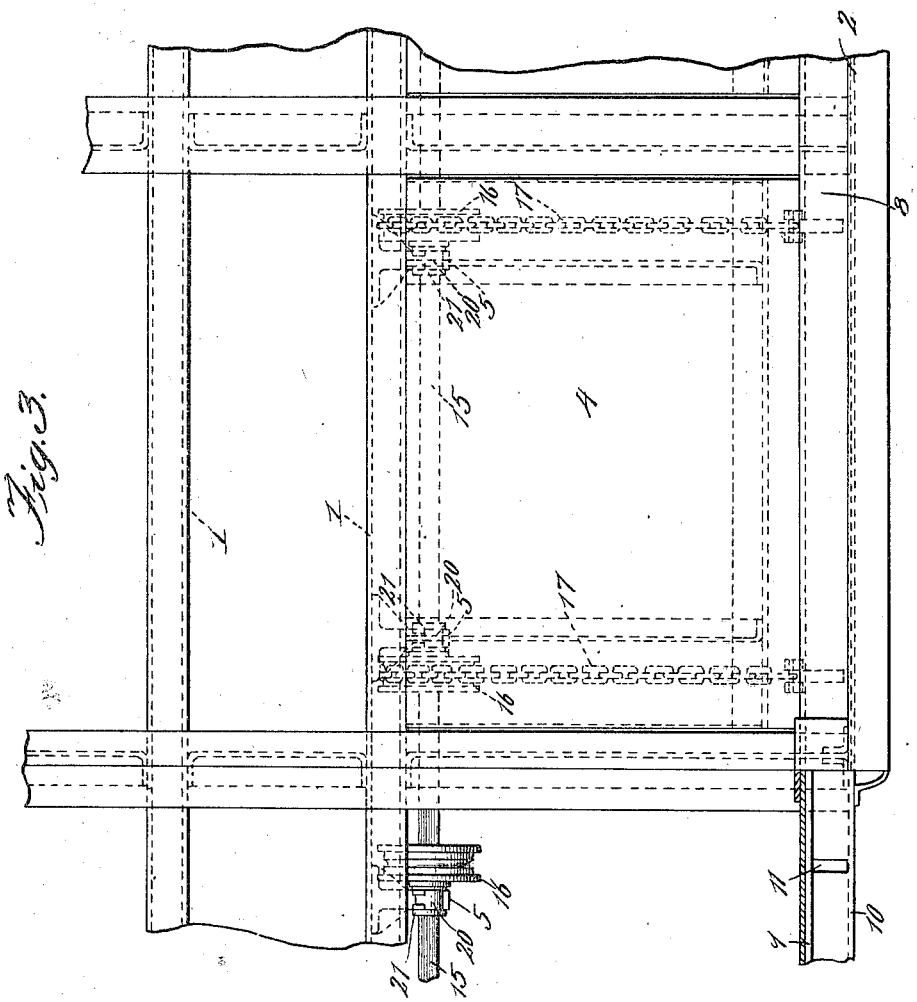

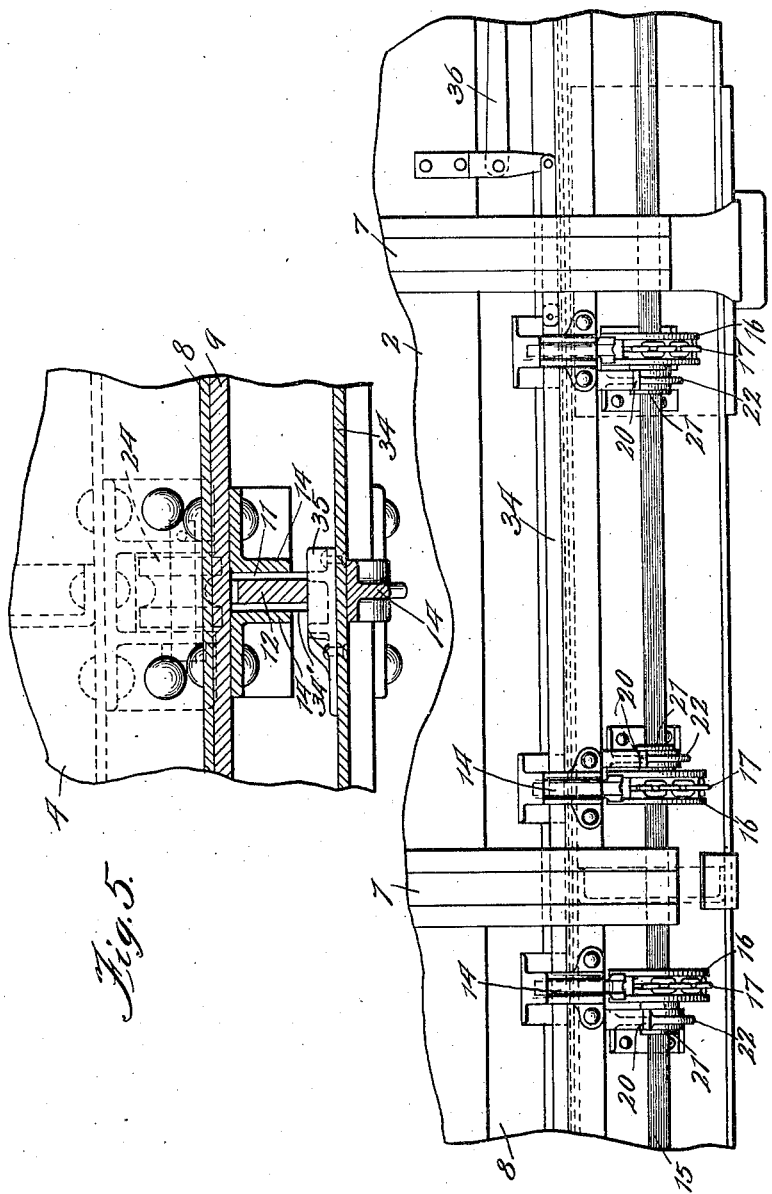

J. PEARSON.
DUMP CAR CONSTRUCTION OR THE LIKE.
APPLICATION FILED APR. 4, 1910.
986,309.
Patented Mar. 7, 1911.
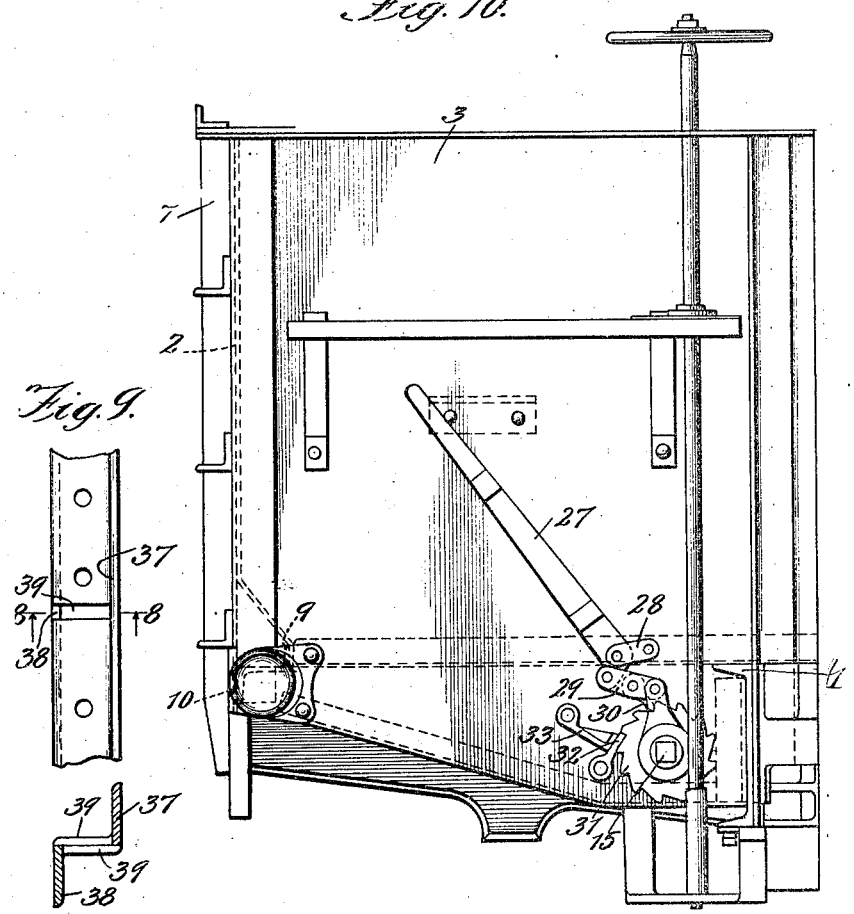
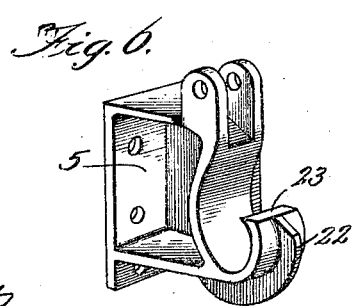

UNITED STATES PATENT OFFICE.

JOHN PEARSON, OF CHICAGO, ILLINOIS.

DUMP-CAR CONSTRUCTION OR THE LIKE.

986,309.  Specification of Letters Patent.  Patented Mar. 7, 1911.

Application filed April 4, 1910. Serial No. 553,344.

*To all whom it may concern:*

Be it known that I, JOHN PEARSON, a citizen of the United States, residing at Chicago, in the county of Cook and State of Illinois, have invented certain new and useful Improvements in Dump-Car Constructions or the Like, of which the following is a description.

My invention belongs to that class of devices known as car constructions or the like, and relates particularly to certain dump door mechanism and to the construction of the car, having among its objects the production of a simple, convenient, durable, efficient and satisfactory construction of the kind described for use wherever found applicable.

To this end my invention consists in the novel construction, arrangement and combination of parts herein shown and described and more particularly pointed out in the claims.

Referring to the drawings in which like reference characters indicate like or corresponding parts, Figure 1 is a cross sectional view of a portion of a car showing one of the dump doors open, Fig. 2 is a similar cross sectional view showing the door closed, Fig. 3 is a top plan view of the bottom of a portion of the car showing the door closed and also a portion of one door opening, the door removed, Fig. 4 is a side elevation of a portion of the car, Fig. 5 is a sectional view taken substantially on line 5—5 of Fig. 2, Fig. 6 is a perspective view of one of the winding shaft supports and door hinge, Fig. 7 is a view of one of the winding shaft drums, Fig. 8 is a sectional view of a modified form of side beam taken substantially on line 8—8 of Fig. 9, Fig. 9 is a top elevation of a portion of the same, Fig. 10 is an end elevation of a portion of the car showing suitable mechanism for operating one of the winding shafts.

The complete car is not shown in all its details inasmuch as the body of the car may be constructed in any suitable manner. As shown, it comprises beams 1 arranged centrally and longitudinally of the car, side walls 2 and end walls 3. The car is provided with a plurality of dump doors 4 preferably arranged and hinged centrally longitudinally of the car to form the bottom or floor when closed. As shown, the doors are preferably pivotally secured to a plural-ity of brackets 5, etc. carried by the beams 1, the construction of the brackets being more fully explained hereafter. The sides of the car are provided with posts and are inwardly offset, as at 8.

At the sides of the car I arrange a Z bar 9—10 extending along the side of the car and provided at intervals with a plurality of transverse openings 11 therethrough. Suitably pivotally carried from the beams 9—10 are a plurality of hook members 12 which support and lock the doors in their closed positions. The hook members 12 are each pivotally supported as at 13 see Figs. 1, 2 and 5, by means of suitable brackets 14 or their equivalents secured to the beam 9—10 and the part 8 of the side walls. There may be any number of hooks and brackets 14 therefor; as shown, two are provided for each door. In the construction shown in Figs. 8 and 9 instead of one integral Z bar I show two angle bars 37 and 38 provided with openings 39 cut therethrough from one angle to the edge, which bars may be secured together in any suitable way. This construction is the equivalent of the Z bar 9—10 above mentioned, but owing to the double thickness is somewhat stiffer and stronger. By the use of the Z bars or their equivalents not only do the beams have great stiffness or rigidity, but the hooks are fully protected. It will be noted that the hooks are covered and protected by the brackets 14 and these with the Z beams protect the hooks from the weather as well as from injury.

The doors are opened and closed and the hook members controlled substantially as described in my pending application, Serial No. 511,692, filed August 7, 1909, in which I employ a winding shaft and drums arranged thereon and suitable flexible members, each having one end secured to a drum and the opposite end secured to one of the hook members, the same coöperating with the free edge of the door so that by straining the flexible members the doors are closed and locked.

As shown, 15 is the winding shaft, two pieces of shaft on each side of the car, each one controlling one half of the doors on that side, being preferably provided. On the winding shaft 15, which may be made square, hexagonal or the like, are arranged drums 16, to which are secured the cables

17, the opposite end of the cables being secured to the forked ends 18 of the hooks 12 by means of pins 19 or their equivalents. Each of the drums is provided with an extended part or bearing 20 preferably flanged as at 21. The brackets 5 before mentioned, are made in the forms of hooks, as at 22, and each arranged to support the extensions 20 or bearings on the drums and the winding shafts 15 passing therethrough, the flanges 21 preventing movement of the drums longitudinally the winding shafts and the irregular shape of the shafts preventing rotation of the drums thereon. The hook part is preferably extended back slightly as at 23 to prevent the winding shaft and drums from raising during the operation, it being necessary to push the shaft toward the beam 1 as well as to raise it when removing.

The edges of the doors are preferably provided with rolls 24, one for each chain 17, and with a Z bar or beam 25 having openings 26 therethrough, through which the flexible members may pass. This construction guides and keeps the flexible member 17 in place on the rolls 24. The Z bars may be cut away slightly on the upper flange at each roll if desired.

The winding shaft 15 is operated as shown by means of a lever 27 pivotally connected to the end of the car body by means of a link 28 and to a member 29 carrying a pawl 30 arranged to coöperate with a suitable ratchet 31. The ratchet 31 is prevented from making a reverse rotation while taking a fresh bite with the pawl 30 during the winding by means of a locking pawl 32 and a lock 33 therefor. Any equivalent devices may be employed.

The hooks or members 12 may be locked in operative position when the doors are closed in any suitable or preferable manner. As shown, this is accomplished by means of locking rods 34 carrying members 35 arranged to force the locking members or hooks into operative position when the doors are closed. The rods 34 may be operated by means of suitable levers 36 or their equivalents. In the preferred construction I use two locking bars on each side of the car, one controlled from each end of the car for each half of the hooks on that side.

It should be particularly noted that in the construction of car shown and described the locking members or hooks are fully protected, the chains or flexible members are maintained in position relative to the free edges of the doors, and the drums are secured on the winding shafts so as to rotatably support the same, and yet so that they will not rotate about or move longitudinally of the shafts. When the drums are so maintained in position it is unnecessary to secure them to the winding shafts with screws, bolts or the like and thereby possibly weakening the same or the winding shaft, thereby giving a more substantial and rigid construction.

Having thus described my invention it is obvious that various immaterial modifications may be made in the same without departing from the spirit of my invention, hence I do not wish to be understood as limiting myself to the exact form, construction, arrangement or combination of parts herein shown or described or uses mentioned.

What I claim as new and desire to secure by Letters Patent is:

1. In a device of the kind described and in combination, a car door pivotally supported at one side thereof, a plurality of door supporting members arranged at the opposite side of said door, supporting beams for said members positioned on the inner side of the line of the side walls of the car body and provided with openings therethrough, said members extending through said openings, and means for operating said members as desired.

2. In a device of the kind described and in combination, a car door pivotally supported at one side thereof, a plurality of door supporting hooks arranged at the opposite side of said door, a Z-shaped supporting beam for said hooks positioned on the inner side of the side wall of the car body and provided with transverse openings therethrough, said hooks extending through said openings, and means for controlling said hooks.

3. In a device of the kind described and in combination, a plurality of doors pivotally supported at one edge thereof, means for supporting the free edges of said doors comprising a plurality of hooks, supporting means for said hooks comprising a substantially Z-shaped member positioned on the inner side of the side wall of the car body and provided with openings therethrough, said hooks extending through said openings.

4. In a device of the kind described and in combination, a plurality of car doors each pivotally supported at one edge thereof, a Z-shaped supporting member arranged at the opposite side of said doors provided with transverse openings therethrough, a plurality of door engaging hooks for each door, means for covering and pivotally supporting said hooks on said supporting member on axes longitudinal of the car, said hooks extending through said openings, and means for controlling said hooks.

5. In a device of the kind described and in combination, a car door, means for pivotally supporting one edge of the door, a plurality of hooks for supporting the opposite edge of the door when closed, a Z-shaped beam provided with transverse openings therethrough arranged at the free edge of said door at the inner side of the side wall, means for pivotally supporting said hooks and securing the same to said beam, means for closing said door and drawing said hooks into operative position, and means for positively locking said hooks in said operative position.

6. In a device of the kind described and in combination, a car door, beams arranged on two sides thereof, said door pivotally secured to one of said beams, a plurality of brackets carried by said beam, the other beam provided with openings therethrough, a plurality of hooks pivotally carried by said beam on axes longitudinal thereof, said hooks extending through said openings and arranged to engage the free edge of the door when closed, means for closing said door and controlling said hooks comprising a winding shaft connected with said hooks, a plurality of drums arranged thereon, means for preventing the rotation of the drums relative thereto, said drums provided with means for rotatably engaging said brackets.

7. In a device of the kind described and in combination, a car door, beams arranged on two sides thereof, said door pivotally secured to one of said beams, a plurality of brackets carried by said beam, the other beam being provided with openings therethrough, a plurality of hooks pivotally carried by said beam on axes longitudinal thereof, said hooks extending through said openings and arranged to engage the free edge of the door when closed, and means for closing said door and operating said hooks comprising a winding shaft connected with said hooks, a plurality of drums arranged thereon, means for preventing rotation of the drums relative thereto, said drums provided with means for rotatably engaging said brackets, and means for preventing the longitudinal movement of the drums relative to the winding shaft.

8. In a device of the kind described and in combination, a car door, beams arranged on two sides thereof, said door pivotally secured to one of said beams, the other beam being provided with openings therethrough, a plurality of hooks pivotally carried by said beam on axes longitudinal thereof, said hooks extending through said openings and arranged to engage the free edge of the door when closed, and means for closing said door and operating said hooks, comprising a winding shaft connected with said hooks, drums mounted thereon and arranged to support the shaft and means for rotatably supporting said drums and shaft.

9. In a device of the kind described and in combination, a car door, beams arranged on two sides thereof, said door pivotally secured to one of said beams, the other beam being provided with openings therethrough, a plurality of hooks pivotally carried by said beam on axes longitudinal thereof, said hooks extending through said openings and arranged to engage the free edge of the door when closed, and means for controlling said door, including a winding shaft, a plurality of drums mounted thereon, but non-rotatably relative thereto, each of said drums provided with an extension thereof forming a bearing, and a hooked supporting member for each of said drums and said shaft arranged to rotatably engage said drum extensions.

10. In a device of the kind described and in combination, a car door, beams arranged on two sides thereof, said door pivotally secured to one of said beams, the other beam being provided with openings therethrough, a plurality of hooks pivotally carried by said beam on axes longitudinal thereof, said hooks extending through said openings and arranged to engage the free edge of the door when closed, and means for controlling said door including a winding shaft, a plurality of drums non-rotatably mounted thereon, each of said drums provided with a flanged extension thereon forming a bearing, and a hook supporting member for each of said drums and said shaft arranged to rotatably engage said bearings.

11. In a device of the kind described and in combination, a plurality of dump doors arranged on each side of the car and pivotally supported centrally and longitudinally thereof, a Z shaped beam arranged along each side of the car proximate to the free edges of said doors, said beams provided with transverse slots therein, a plurality of brackets carried upon the upper face of said beams, a plurality of door engaging hooks for each door pivotally carried by said brackets and extending through said slots, a plurality of winding shafts, a plurality of drums non-rotatably mounted on said shafts, said drums provided with bearings thereon, flexible means for connecting said drums and hooks and means for engaging and rotatably supporting said drum bearings.

12. In a device of the kind described and in combination, a plurality of dump doors arranged on each side of the car and pivotally supported centrally and longitudinally thereof, each of said doors provided with a Z bar at the free edge thereof, said bars having transverse openings therethrough, a Z-shaped beam arranged along each side of the car proximate to the free edges of said doors, said beams provided with transverse openings therethrough, a plurality of brackets carried upon the upper face of said beams, a plurality of door engaging hooks for each door pivotally carried by said brackets and extending through said openings, a plurality of winding shafts, a plurality of drums non-rotatably mounted on said shafts, said drums provided with bearings thereon, flexible means extending through the openings in said Z bars on said doors for connecting said drums and hooks, and means for engaging and rotatably supporting said drum bearings.

In testimony whereof, I have hereunto signed my name in the presence of two subscribing witnesses.

JOHN PEARSON.

Witnesses:
 Roy W. Hill,
 Charles I. Cobb.